United States Patent Office 3,585,228
Patented June 15, 1971

3,585,228
γ-NITRATOPROPYL SILANES
Sandor Barcza, West Orange, N.J., assignor to
Sandoz-Wander, Inc., Hanover, N.J.
No Drawing. Filed Feb. 25, 1969, Ser. No. 802,209
Int. Cl. C07f 7/10
U.S. Cl. 260—448.2N          5 Claims

ABSTRACT OF THE DISCLOSURE

Lower alkyl silanes having from 1 to 4 of the alkyl groups replaced by a γ-nitratopropyl function are useful pharmaceutically e.g., (γ-nitratopropyl)trimethylsilane.

---

This invention relates to nitrato-substituted organic compounds and more particularly to nitratopropyl group-containing silicon compounds, and to the preparation of such compounds, as well as to therapeutic compositions containing such compounds and to the use of such compositions.

The nitratopropyl group containing organo silanes of this invention may be conveniently represented by the structural Formula I

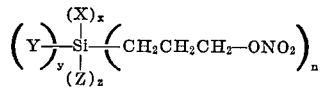

(I)

wherein:

$n$ is a whole integer of from 1 to 4;
each of $x$, $y$ and $z$ is a whole integer of from 0 to 3; and
the sum of $x+y+z+n=4$; and
each of X, Y and Z is, independently, lower alkyl, e.g., having from 1 to 4 carbon atoms, preferably straight chain alkyl, such as methyl, ethyl, propyl or butyl.

Compounds I are obtainable by reaction of an appropriate silane having from 1 to 4 γ-hydroxypropyl functions, i.e. a compound II

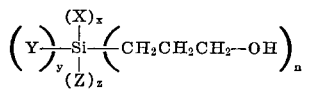

(II)

wherein X, Y. Z, $x$, $y$, $z$ and $n$ are as defined above, with a nitrating agent (Step A).

Suitable nitrating agents are those conventionally used to convert a terminal-hydroxyalkyl function to the corresponding nitratoalkyl function, e.g., lower alkanoyl nitrate, formed by mixing concentrated nitric acid with lower fatty acid anhydride, preferably nitric acid-acetic acid anhydride. The reaction is preferably carried out at reduced temperatures, e.g., at from about −15° to +10° C., preferably at about −5° to +5° C. The reaction may be carried out in an inert solvent, e.g., acetic acid, or methylene dichloride. However, no solvent is required when the nitrating agent can serve as the reaction medium under the reaction conditions. Preferably, excess nitrating agent is used, e.g., in a ratio of from about 1.1 to 5 equivalents of nitrating agent per equivalent of hydroxy group on compound II, perferably in a ratio of from about 1.4 to 1.8 equivalents of nitrating agent per equivalent of hydroxy group.

Various of compounds II are known and may be prepared as described in the literature, or where not known they may be prepared in a manner analogous to that described in the literature, e.g., as described by J. L. Speier in the Journal of the American Chemical Society, vol. 74, pages 1003 to 1010 (1952).

Alternatively, compounds II may be prepared from appropriate allyl-substituted silanes (compounds III)

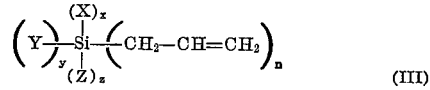

(III)

wherein X, Y, Z, $x$, $y$, $z$ and $n$ are as defined above by hydrating in a manner whereby a terminal hydroxy function results, for example, by converting the compound III to a boron-containing intermediate (IV) by treatment with a boron reagent (V), then oxidizing the intermediate (IV) to the corresponding compound II. This procedure is conveniently illustrated by Reaction Scheme A, below, wherein X, Y, Z, $x$, $y$, $z$ and $n$ are as defined above; and each of $A^1$ and $A^2$ is, independently a hydrogen atom or lower alkyl, e.g., having from 1 to 4 carbon atoms, preferably straight chain.

REACTION SCHEME A

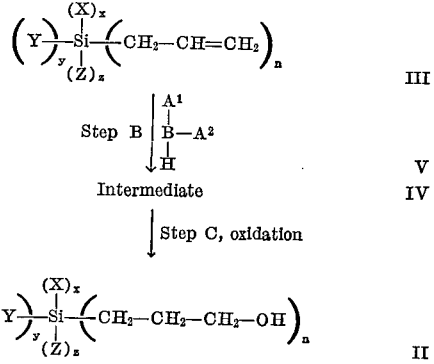

In the above presented Reaction Scheme A, Step B is the reaction of a boron reagent, (V) with a compound III resulting in the formation of an intermediate having propyl moieties terminated by residues of the boron compound (V). The reaction (Step B) is carried out under conditions relatively free from oxygen and hydroxy compounds, e.g., moisture, and at a temperature of from about −5° to 50° C., preferably at a temperature of from about 20° to 30° C., and in a suitable inert medium. The boron reagent, compound V, is a boron compound having at least one active hydrogen atom, e.g., $BH_3$ or a lower alkyl boron hydride. Preferably, the boron reagent is used in the form of a tetrahydrofuran-borane reagent

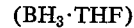

($BH_3 \cdot THF$)

As the boron reagent may have up to three available hydrogen atoms, it may be used in as low a molar ratio of ⅓ mole of compound V per equivalent of allyl function of compound III; however, it is preferable to use mole ratios of up to 1:1 mole of compound V per allyl function of compound III, even where $BH_3$ is used as compound V. Any reactive hydrogen atoms remaining on the resultant intermediate (IV), are then "deactiviated," e.g., by carefully adding water to the intermediate with cooling in a quantity of about 1 mole of water per active hydrogen atom, i.e. H–B/₃ moiety, employed in Step B. The "deactivation" should be carried out with caution as the reaction is exothermic and hydrogen gas is evolved. Cooling is preferable to about 0° C. Step C is an oxidation under basic conditions, resulting in the conversion of the boron-containing intermediate (IV) to its corresponding γ-hydroxypropyl group-containing silane (II). The intermediate (IV), after "deactivation" if needed, is oxidized in the presence of water and under basic conditions, e.g., pH 7.5 to 13. Suitable oxidizing agents include hydrogen peroxide, e.g., 15% to 50% aqueous solution, and organic hydroperoxides, such as t-butyl hydroperoxide and cumene hydroperoxide. Basic conditions are conveniently provided by the presence of an inorganic base, preferably a basic water-soluble alkali metal compound, such as sodium or potassium hydroxide or carbonate, or tertiary amine which is relatively basic, e.g., a low molecular weight tertiary alkyl amine, which preferably is volatile, e.g., triethylamine, or N-methylpiperidine.

The oxidation may be carried out at −5° to 50° C., but it is preferred to mix the reactant at about 0° C. and then allow the reaction mixture to warm to about 25° C. and maintain the reaction mixture at such temperature until a substantial amount of product is formed, e.g., for from about 6 to 36 hours.

In carrying out Step C, about one equivalent of oxidizing agent should be provided for each allyl moiety of the compound III starting material. It is preferred to use a slight equivalent excess of oxidizing agent, e.g., up to 20%, e.g., in 10% excess.

Various compounds III are known and may be prepared in the manner described in the literature. For example, compounds III may be prepared by reacting a halo-silane (compound VI) with an allyl-function containing metallo-organic compound, as may be illustrated by Reaction Scheme B, below, wherein X, Y, Z, $x$, $y$, $z$ and $n$ are as defined above and Hal is a halogen having an atomic weight of from 35 to 127, i.e. a chlorine, bromine or iodine atom, and M is a reactive metallo moiety, such as an alkali-metal or alkali-earth metal halide or aluminum dihalide; said halide being -chloride, -bromide or -iodide. Where a polyvalent metal is used the additional valences may be occupied by either additional allyl moieties or halide moieties.

REACTION SCHEME B

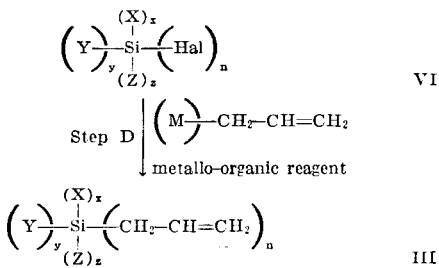

The procedure represented in Reaction Scheme B, above, for the preparation of compounds III, involves an alkylation (Step D) of a suitable compound VI to form the corresponding compound III.

The number of "Hal" units on the compound VI will determine the number of positions available for alkylation. As is clear from the structural formulae in the reaction schemes, the type and number of alkyl functions (i.e. X, Y, Z, $x$, $y$ and $z$) is not changed during the reactions. Hence, the choice of starting materials is governed by the structure desired for the final product (compound I). Similarly, the number of functional units, i.e. "$n$," on the starting material determines the number of units replaced on its product, i.e. the number of "Hal-" units on a compound VI determines the number of allyl units on a compound III, which in turn determines the number of γ-hydroxypropyl units on a compound II which in turn determines the number of γ-nitratopropyl units the final product (compound I).

Step D is an alkylation which may be carried out under conditions conventionally employed in carrying out Grignard reactions, i.e. the reaction is carried out under relatively moisture-free conditions at moderate temperatures, e.g., at from about −10° to +140° C., preferably at from about −5° to +50° C., and in a suitable medium, e.g., an ether such as absolute diethyl ether or absolute tetrahydrofuran. The allyl-containing organometallic reagent may be prepared in the conventional manner for preparing such reagent, e.g., by reaction of a suitable reactive metal with an allyl halide in an appropriate medium. Suitable metals are aluminum and the alkali and alkali-earth metals, such as sodium, potassium, lithium, zinc and magnesium. Preferably, the organo-metallic reagent is a Grignard reagent and the medium in which such reagent is prepared subsequently serves as the reaction medium for the alkylation (Step D).

The compounds I of the invention are useful pharmaceutically, i.e. as coronary dilators, as indicated on intravenous administration to the anesthetized dog and measurement of blood flow through the anterior descending branch of the left coronary artery (1–15 mg./kg. dosage).

For such usage, the compounds may be administered orally as such or admixed with conventional pharmaceutical carriers. They may be administered orally in such forms as tablets, dispersible powders, granules, capsules, syrups and elixirs, and parenterally as solutions, suspensions, disperseions, emulsions and the like, e.g., a sterile injectable aqueous suspension. The compositions for oral use may contain one or more conventional adjuvants, such as sweetening agents, flavoring agents, coloring agents and preserving agents, in order to provide an elegant and palatable preparation. Tablets may contain the active ingredients in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan mono-oleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersing or wetting agents and suspending agents identical or similar to those mentioned above. These pharmaceutical preparations may contain about 10–90% of the active ingredient in combination with the carrier or adjuvant.

A representative formulation is a tablet (prepared by standard tabletting procedures) and containing the following ingredients:

| Ingredient: | Parts by weight |
|---|---|
| Tetra(γ-nitratopropyl)silane | 5 |
| Tragacanth | 2 |
| Lactose | 84.5 |
| Corn starch | 5 |
| Talcum | 3 |
| Magnesium stearate | 0.5 |

For the above-mentioned use, the dosage administered will, of course, vary depending upon the compounds used, the therapy desired and the mode of administration. However, in general, satisfactory results are obtained when administered at a daily dosage of from about 0.1 milligram to about 15 milligrams per kilogram of animal body weight, preferably given in divided doses 2 to 4 times a day, or in sustained release form. For larger mammals the administration of from about 5 milligrams to about 40 milligrams of the compound per day provides satisfactory results and dosage forms suitable for internal administration comprise from about 1.25 milligrams to about 20 milligrams of the compound as the active ingredient. In preparing and administering pharmaceutical compositions containing compounds I, precautions should be observed as are conventionally exercised in handling the well known nitrate dilators which are explosive.

Compounds I are useful as explosives as may be shown by standard tests, e.g., heating in a confined space.

Examples illustrative of this invention are given below. In the examples all temperatures are centigrade, and room temperature is 25° C., unless specifically indicated otherwise.

EXAMPLE 1

(γ-Nitratopropyl)trimethylsilane

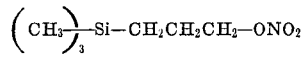

This example illustrates the conversion of a compound II to a corresponding compound I.

1.6 moles of concentrated nitric acid (90%) is cooled to about −20°. 2.3 moles of acetic anhydride is cautiously added thereto with stirring and cooling to about −20°. The mixture is allowed to warm to 0° and 1 mole of (γ-hydroxypropyl)trimethylsilane is added thereto, dropwise, with stirring and cooling, from a vessel which is then rinsed with a minimum amount of acetic acid, and the rinse added to the reaction mixture. The reaction mixture is stirred for an additional 10 minutes, the temperature of about 0° being maintained.

The cooled reaction mixture is then dropwise added to a vessel containing about 6.5 moles of Normal sodium bicarbonate solution followed by an acetic acid rinse, with stirring and cooling to about 0°. Additional bicarbonate solution is added as needed to at least neutralize the acetic acid rinse. Stirring and cooling are continued for an additional 15 minutes, at which time the pH of the neutralized mixture should be greater than 7.

The thus-neutralized reaction mixture is twice extracted with 200 ml. portions of methylene chloride, which extracts are combined, dried over anhydrous sodium sulfate and concentrated in vacuo, at below 25°, to obtain (γ-nitratopropyl)trimethylsilane as an oil.

EXAMPLE 2

(γ-Hydroxypropyl)trimethylsilane

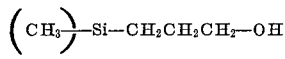

This example illustrates the preparation of a compound II, useful for conversion to a compound I.

STEP A.—PREPARATION OF ALLYL-TRIMETHYLSILANE

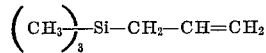

Allylmagnesium bromide Grignard reagent is prepared by reacting under nitrogen 3 moles of allyl bromide with 3 moles of magnesium metal in 1.25 liters of absolute ether.

The resultant allylmagnesium bromide Grignard reagent (3 moles) is then heated to reflux and 1 mole of trimethylchlorosilane is added thereto slowly, so as to maintain reflux. 200 ml. of benzene (abs.) is then optionally added to promote agitation of the reaction mixture. Refluxing is maintained for an additional 45 minutes. The reaction mixture is then cooled to about 0°; and then carefully added to about 500 ml. of saturated aqueous ammonium chloride solution (at about 0°) and the mixture stirred for 10 minutes. The organic phase is then separated, washed with a small portion of water, dried over anhydrous magnesium sulfate and concentrated in vacuo, at about 20° to obtain a residue. The residue is then fractionally distilled to obtain allyl-trimethylsilane.

STEP B.—PREPARATION OF BORON-CONTAINING SILANE INTERMEDIATE

One mole of borane.tetrahydrofuran reagent is held under a nitrogen atmosphere, and cooled to about 0°. One mole of allyl-trimethylsilane (prepared as described in Step A above) is added (by injection) with stirring. Additional absolute tetrahydrofuran is optionally added to promote agitation. The reaction mixture is stirred at about 25° for 3 hours. The reaction mixture is then cooled to about 0°, and 1 mole of water is cautiously added with stirring (caution: hydrogen gas evolves). The resultant aqueous mixture is used in Step C, below.

STEP C.—PREPARATION OF (γ-HYDROXYPROPYL) TRIMETHYLSILANE 1.1 mole of triethylamine and 1.1 mole of t-butyl hydroperoxide are cooled to about 0° then mixed together and then added at about 0° to the 1 mole of boron intermediate prepared in Step B, above (molarity estimated on the basis of the molarity of the reactants, used in its preparation). The reaction mixture is then allowed to warm to about 25° and is held at such temperature, with stirring, for about 18 hours. The reaction mixture is then evaporated under vacuum to about 40° to remove solvents and unreacted volatile reactants and reaction by-product (e.g., t-butanol), leaving a residue. The residue is cooled to about 0° then combined with about 500 ml. of THF and 600 ml. of 2 N sodium hydroxide. Stirring is continued for 1 hour at about 25°. The organic phase is separated and the aqueous phase is extracted with 300 ml. of tetrahydrofuran. The organic phases are combined, then passed through a cotton plug, and then concentrated in vacuo to obtain (γ-hydroxypropyl)trimethylsilane as residue.

EXAMPLE 3

(γ-Hydroxypropyl)trimethylsilane (alternative method)

The oxidation of the boron-containing intermediate (Step C of Example 2) may alternatively be carried out by adding to the aqueous mixture containing resultant boron-containing intermediate obtained in Step B, at about 0°, 1.1 mole of 3 N sodium hydroxide, then carefully adding thereto 100 ml. of cooled (to about 0°) 30% aqueous hydrogen peroxide solution. The mixture is stirred for about 1 hour at about 0°. The (γ-hydroxypropyl)trimethylsilane so formed is recovered in the same manner as described in Step C of Example 2.

EXAMPLE 4

Following the procedures described in Examples 1 and 2 for the preparation of a mono-substituted silane, di-, tri- and tetra-γ-nitratopropyl substituted-silanes are obtained, as determined by the selection of the starting material and employing reactants, reagents and solvents in quantities which are appropriate multiples of those used in the examples.

The products of the examples may be characterized by NMR spectrum. Tetra(γ-hydroxypropyl)silane has a melting point of 107°.

Starting materials (compounds VI), appropriate multiple (factor), final products (compounds I) and melting point(s) when applicable, are indicated in Table I, below.

TABLE I

| Starting material | Factor | Final product | M.P. |
| --- | --- | --- | --- |
| Dichloro-dimethylsilane | 2 | Dimethyl-di-(γ-nitratopropyl) silane. | Oil. |
| Methyl-trichlorosilane | 3 | Methyl-tri-(γ-nitratopropyl) silane. | Oil. |
| Tetrachlorosilane | 4 | Tetra(γ-nitratopropyl) silane. | 70°. |

What is claimed is:
1. A compound of the formula

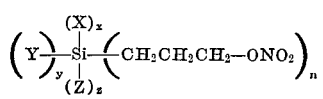

wherein:

$n$ is a whole integer of from 1 to 4;
each of $x$, $y$ and $z$ is a whole integer of from 0 to 3; and
the sum of $x+y+z+n=4$; and
each of X, Y and Z is, independently, lower alkyl.

2. The compound of claim 1 which is (γ-nitratopropyl)-trimethylsilane.

3. The compound of claim 1 which is dimethyl-di-(γ-nitratopropyl)silane.

4. The compound of claim 1 which is methyl-tri(γ-nitratopropyl)silane.

5. The compound of claim 1 which is tetra-(γ-nitratopropyl)silane.

References Cited

UNITED STATES PATENTS

| | | | |
|---|---|---|---|
| 2,756,246 | 7/1956 | Burkhard | 260—448.2N |
| 2,985,680 | 5/1961 | Pepe | 260—448.2N |
| 3,127,431 | 3/1964 | Fink | 260—448.2NX |
| 3,222,319 | 12/1965 | Fink | 260—448.2NX |

TOBIAS E. LEVOW, Primary Examiner

PAUL F. SHAVER, Assistant Examiner

U.S. Cl. X.R.

149—23; 260—448.2R; 424—184